United States Patent
Ohara

(10) Patent No.: US 11,657,632 B2
(45) Date of Patent: May 23, 2023

(54) IMAGE PROCESSING DEVICE, IMAGE READING DEVICE, IMAGE PROCESSING METHOD, AND NON-TRANSITORY COMPUTER READABLE MEDIUM, USING TWO PIECES OF IMAGE DATA

(71) Applicant: PFU LIMITED, Ishikawa (JP)

(72) Inventor: Keiji Ohara, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 17/437,589

(22) PCT Filed: Mar. 13, 2019

(86) PCT No.: PCT/JP2019/010155
§ 371 (c)(1),
(2) Date: Sep. 9, 2021

(87) PCT Pub. No.: WO2020/183628
PCT Pub. Date: Sep. 17, 2020

(65) Prior Publication Data
US 2022/0150374 A1    May 12, 2022

(51) Int. Cl.
*H04N 1/04* (2006.01)
*G06V 30/413* (2022.01)
(Continued)

(52) U.S. Cl.
CPC ....... *G06V 30/413* (2022.01); *H04N 1/00331* (2013.01); *H04N 1/00336* (2013.01);
(Continued)

(58) Field of Classification Search
None
See application file for complete search history.

(56) References Cited

U.S. PATENT DOCUMENTS

| 9,878,790 B2 * | 1/2018 | Burgunder ................ B64C 1/20 |
| 2011/0032579 A1 * | 2/2011 | Murakata ........... H04N 1/00933 |
| | | 358/403 |

(Continued)

FOREIGN PATENT DOCUMENTS

| JP | H05-120356 A | 5/1993 |
| JP | 2007-180872 A | 7/2007 |

(Continued)

OTHER PUBLICATIONS

International Search Report issued in corresponding PCT/JP2019/010155, dated Jul. 2, 2019 w/English Translation.

(Continued)

*Primary Examiner* — Dung D Tran
(74) *Attorney, Agent, or Firm* — McDermott Will & Emery LLP

(57) ABSTRACT

An image processing device comprising a processor configured to: determine presence or absence of a face image for each of a plurality of pieces of image data read from at least one image presenting medium, and decide a relationship for the plurality of pieces of image data, based on a result of the determination. The relationship is a front and back of the image presenting medium or a page order, and the processor is further configured to: decides that image data including a face image is on a front side of the image presenting medium or on a page before image data not including a face image.

6 Claims, 7 Drawing Sheets

OUTPUT IMAGE FROM IMAGE PROCESSING DEVICE 5 WHEN FRONT AND BACK ARE SCANNED CORRECTLY, AND OUTPUT IMAGE WHEN FRONT AND BACK ARE SCANNED INCORRECTLY

(51) Int. Cl.
  *H04N 1/00* (2006.01)
  *H04N 1/387* (2006.01)
  *G06V 30/12* (2022.01)
  *G06V 40/16* (2022.01)
(52) U.S. Cl.
  CPC ..... *H04N 1/00721* (2013.01); *H04N 1/00734* (2013.01); *H04N 1/3877* (2013.01); *G06V 30/133* (2022.01); *G06V 40/161* (2022.01)

(56) References Cited

U.S. PATENT DOCUMENTS

| | | | |
|---|---|---|---|
| 2015/0341370 A1* | 11/2015 | Khan | H04L 63/20 726/30 |
| 2017/0195515 A1* | 7/2017 | Dolev | G06F 16/93 |
| 2018/0174324 A1* | 6/2018 | Miyauchi | G06V 30/414 |
| 2018/0295249 A1 | 10/2018 | Murakami | |
| 2020/0045226 A1* | 2/2020 | Lertsumruaypun | G06V 40/40 |
| 2022/0335751 A1* | 10/2022 | Hayase | G06F 21/32 |

FOREIGN PATENT DOCUMENTS

| | | |
|---|---|---|
| JP | 2016-139326 A | 8/2016 |
| JP | 6074968 B2 | 2/2017 |
| JP | 2017-182194 A | 10/2017 |
| JP | 2018-078464 A | 5/2018 |
| JP | 2018-93310 A | 6/2018 |
| JP | 2018093310 A * | 6/2018 |

OTHER PUBLICATIONS

Office Action issued from corresponding Japanese Application No. 2021-504693 dated May 27, 2022, with English Translation.
Japanese Office Action issued in corresponding Japanese Patent Application No. 2021-504693, dated Dec. 13, 2022, with an English translation.
Extended Search Report has been issued in the corresponding European Patent Application No. 19919290.7, dated Oct. 10, 2022.

* cited by examiner

OUTPUT IMAGE FROM IMAGE PROCESSING DEVICE 5
WHEN FRONT AND BACK ARE SCANNED CORRECTLY, AND
OUTPUT IMAGE WHEN FRONT AND BACK ARE SCANNED
INCORRECTLY

FRONT-BACK DETERMINATION PROCESSING (S10)

FIG. 6

| FRONT SIDE FACE IMAGE DETERMINATION RESULT | BACK SIDE FACE IMAGE DETERMINATION RESULT | FRONT-BACK SWAPPING NECESSITY |
|---|---|---|
| NO FACE IMAGE | NO FACE IMAGE | SWAPPING CANDIDATE |
| NO FACE IMAGE | FACE IMAGE | SWAP |
| FACE IMAGE | NO FACE IMAGE | DO NOT SWAP |
| FACE IMAGE | FACE IMAGE | SWAPPING CANDIDATE |

FRONT-BACK SWAPPING NECESSITY BASED ON FACE IMAGE DETERMINATION RESULT

FIG. 7

| FRONT-BACK SWAPPING NECESSITY | OCR TEMPLATE TO BE USED |
|---|---|
| SWAP | USE OCR TEMPLATE FOR SIDE OPPOSITE PAPER FEED SIDE |
| SWAPPING CANDIDATE | USE BOTH OCR TEMPLATE FOR PAPER FEED SIDE AND OCR TEMPLATE FOR SIDE OPPOSITE PAPER FEED SIDE |
| DO NOT SWAP | USE OCR TEMPLATE FOR PAPER FEED SIDE |

OCR TEMPLATES BASED ON FRONT-BACK SWAPPING NECESSITY

IMAGE PROCESSING DEVICE, IMAGE READING DEVICE, IMAGE PROCESSING METHOD, AND NON-TRANSITORY COMPUTER READABLE MEDIUM, USING TWO PIECES OF IMAGE DATA

CROSS REFERENCE TO RELATED APPLICATIONS

This application is the U.S. National Phase under 35 U.S.C. § 371 of International Application No. PCT/JP2019/010155, filed on Mar. 13, 2019, the entire contents of which is hereby incorporated by reference.

TECHNICAL FIELD

The present invention relates to an image processing device, an image reading device, an image processing method, and non-transitory computer readable medium.

BACKGROUND ART

Patent Literature 1, for example, discloses a personal information reading and storing device for reading and storing, from an identification card on which text information of an individual is noted using standard characters in accordance with a predetermined format and also image information for identifying the individual is noted, personal information including the text information and the image information. The personal information reading and storing device includes: reading means that photoelectrically read all the noted content of the identification card as the image information; reading direction determination means that determine a reading direction of the identification card on the basis of the image information read by the reading means; validity determination means that determine a validity of the read identification card on the basis of the reading direction determined by the reading direction determination means and the image information read by the reading means; region dividing means that, when the validity determination means determines that the identification card read by the reading means is valid, divide a reading region into a text region and an image region on the basis of a determination result of the reading direction determination means; character recognition means that recognize the text information in the text region divided by the region dividing means on the basis of the image information read by the reading means and convert the recognized text information into character codes; and personal information storing means that store the character codes converted by the text recognition means and the image information in the divided image region.

Patent Literature 2 discloses an image processing device including: a captured image correction unit that, for a front side image and a back side image of a document obtained by imaging, corrects a shape of each image to a shape corresponding to the document; and an image combination unit that combines the front side image and the back side image that are corrected by the captured image correction unit.

CITATION LIST

Patent Literature

[PTL 1] Japanese Unexamined Patent Application Publication No. H05-120356

[PTL 2] Japanese Unexamined Patent Application Publication No. 2007-180872

SUMMARY OF INVENTION

Technical Problem

An objective of the present invention is to provide an image processing device capable of performing processing corresponding to a read side or an image presenting medium.

Solution to Problem

An image processing device according to the present invention includes a determination unit configured to determine presence or absence of a face image for each of a plurality of pieces of image data read from at least one image presenting medium, and a decision unit configured to decide, on the basis of a determination result from the determination unit, a relationship for the plurality of pieces of image data.

Preferably, the relationship is front and back of the image presenting medium or a page order, and the decision unit decides that image data including a face image is on a front side of the image presenting medium or on a page before image data not including a face image.

Preferably, the determination unit determines presence or absence of a face image for two pieces of image data read from one image presenting medium, and the decision unit decides that image data including a face image is on a front side of the image presenting medium.

Preferably, the image processing device further includes an image processing unit configured to change, in accordance with the decided relationship of the image data, image processing to be performed on the image data.

Preferably, the image processing device further includes a definition selecting unit configured to select, on the basis of the relationship decided by the decision unit, definition information for performing character recognition processing.

Preferably, the determination unit determines presence or absence of a face image for two pieces of image data read from one image presenting medium, in a case in which the determination unit determines that only one of the two pieces of image data includes a face image, the decision unit decides the relationship of the two pieces of image data, and the image processing device further comprises an output order control unit configured to swap an output order of the image data in accordance with the relationship decided by the decision unit.

Preferably, the determination unit determines presence or absence of a face image for two pieces of image data read from one image presenting medium, and the image processing device further comprises a display control unit configured to perform a display for prompting a user to perform an operation in a case in which the determination unit determines that a face image is included in both of the two pieces of image data, or in a case in which the determination unit determines that a face image is not included in either of the two pieces of image data.

Preferably, the image processing device further includes a rotation unit configured to perform rotation processing of an image for each piece of image data that is inputted, wherein the determination unit determines presence or absence of a face image for the image data that has been subjected to the rotation processing by the rotation unit.

An image reading device according to the present invention includes a reading unit configured to read image data from both sides of an image presenting medium, a determination unit configured to determine presence or absence of a face image for a plurality of pieces of the image data read by the reading unit, and a decision unit configured to decide, on the basis of a determination result from the determination unit, a relationship for the plurality of pieces of image data.

An image processing method according to the present invention includes determining presence or absence of a face image for a plurality of pieces of image data read from at least one image presenting medium, and deciding, on the basis of a determination result from the determining, a relationship for the plurality of pieces of image data.

A program according to the present invention causes a computer to execute determining presence or absence of a face image for a plurality of pieces of image data read from at least one image presenting medium, and deciding, on the basis of a determination result from the determining, a relationship for the plurality of pieces of image data.

Advantageous Effects of Invention

It is possible to perform processing corresponding to a read side or an image presenting medium.

BRIEF DESCRIPTION OF DRAWINGS

FIG. 6 is a table showing front and back swapping necessity based on a face image determination result.

FIG. 7 is a table showing OCR templates based on the front and back swapping necessity.

DESCRIPTION OF EMBODIMENTS

Hereinafter, embodiments of the present invention are described while referencing the drawings.

Figure 1:
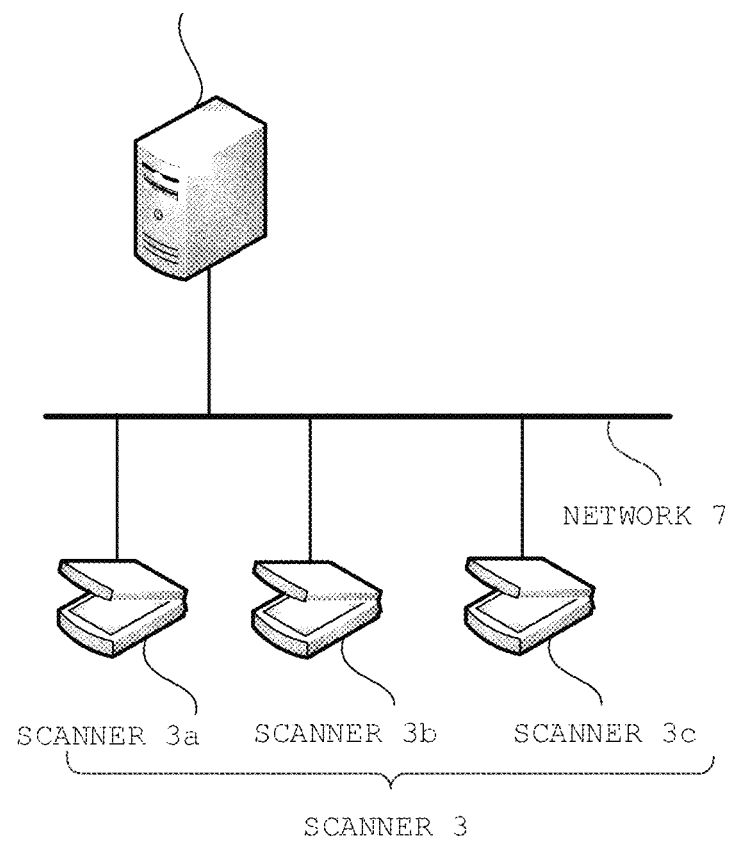
FIG. 1 is a drawing illustrating the overall configuration of an image processing system 1.

FIG. 1 is a drawing illustrating the overall configuration of an image processing system 1.

As illustrated in FIG. 1, the image processing system 1 includes a plurality of scanners 3a, 3b, and 3c, and an image processing device 5 that are connected to each other via a network 7. The scanner 3a, the scanner 3b, and the scanner 3c are collectively referred to as a "scanner 3."

The scanner 3 sends image data acquired by an optical reading device to the image processing device 5. In the present embodiment, the scanner 3 is implemented as a device that scans the front side and the back side of an ID card, such as a license or a business card, that includes a face image. Note that the scanner 3 is an example of the image reading device according to the present invention, and the ID card is an example of the image presenting medium according to the present invention.

The image processing device 5 is implemented as a computer terminal, determines the front and the back of the image data of the front side and the back side received from the scanner 3, and performs processing corresponding to the front side and the back side. Specifically, the image processing device 5 determines the front and back of the image data on the basis of the presence or absence of a face image in the image data, and performs optical character recognition (OCR) processing on each piece of image data on the basis of the determined result.

Next, the content of the processing performed by the image processing device 5 is described.

In a case in which a scanner capable of simultaneously reading both sides reads an ID card, it is possible to divide the processing performed on the front side and the back side by performing OCR processing on the front side but not performing OCR processing on the back side. However, in a case in which an operator of the scanner incorrectly sets the front side and the back side of the ID card, there is a problem in that OCR processing will be performed on the unintended back side and OCR processing will not be performed on the intended front side, thus requiring re-scanning or correction by manual input.

Figure 2:
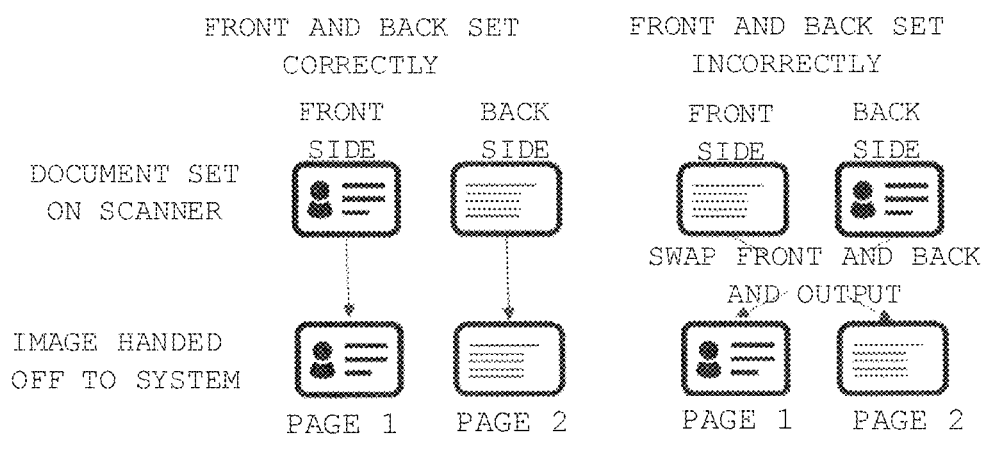
FIG. 2 is a drawing illustrating an output image for a case in which the front and back are correctly scanned by an image processing device 5, and an output image for a case in which the front and back are incorrectly scanned by the image processing device 5.

However, as illustrated in FIG. 2, according to the image processing device 5, in cases in which the front and back are incorrectly scanned by the scanner 3, the front and back are determined on the basis of the presence or absence of the face image, the image data read as the front side and the image data read as the back side are swapped, and the image data including the face image is output as the front side and the image data without a face image is output as the back side. The front and back are determined and output in this manner, and thus, the need for re-scanning or correction by manual input is eliminated even in cases in which the front and back are incorrectly scanned.

Figure 3:
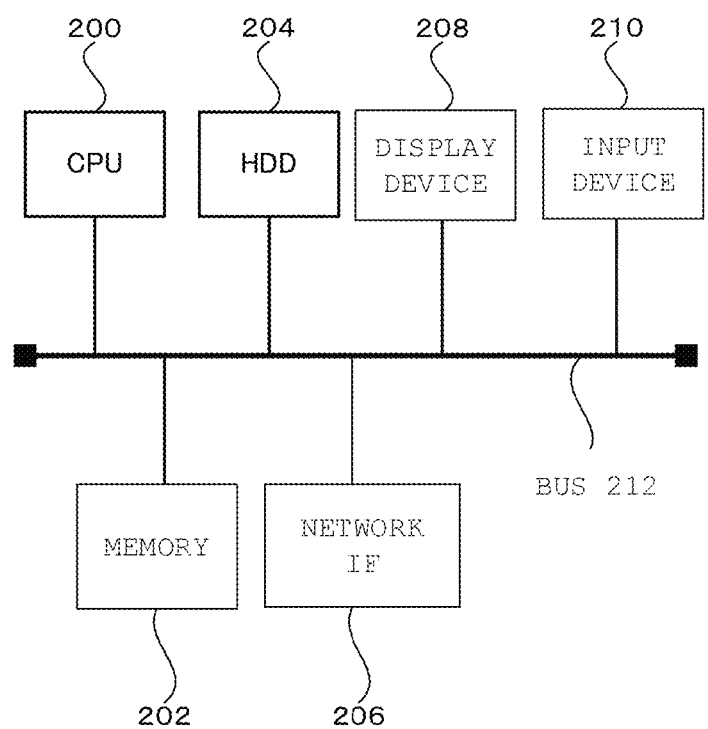
FIG. 3 is a drawing illustrating the hardware configuration of the image processing device 5.

FIG. 3 is a drawing illustrating the hardware configuration of the image processing device 5.

As illustrated in FIG. 3, the image processing device 5 includes a CPU 200, a memory 202, a HDD 204, a network interface 206 (network IF 206), a display device 208, and an input device 210, and these components are connected to each other via a bus 212.

In one example, the CPU 200 is implemented as a central processing unit. In the present embodiment, the CPU 200 has multiple cores.

In one example, the memory 202 is implemented as a volatile memory, and functions as a main storage device.

Figure 4:
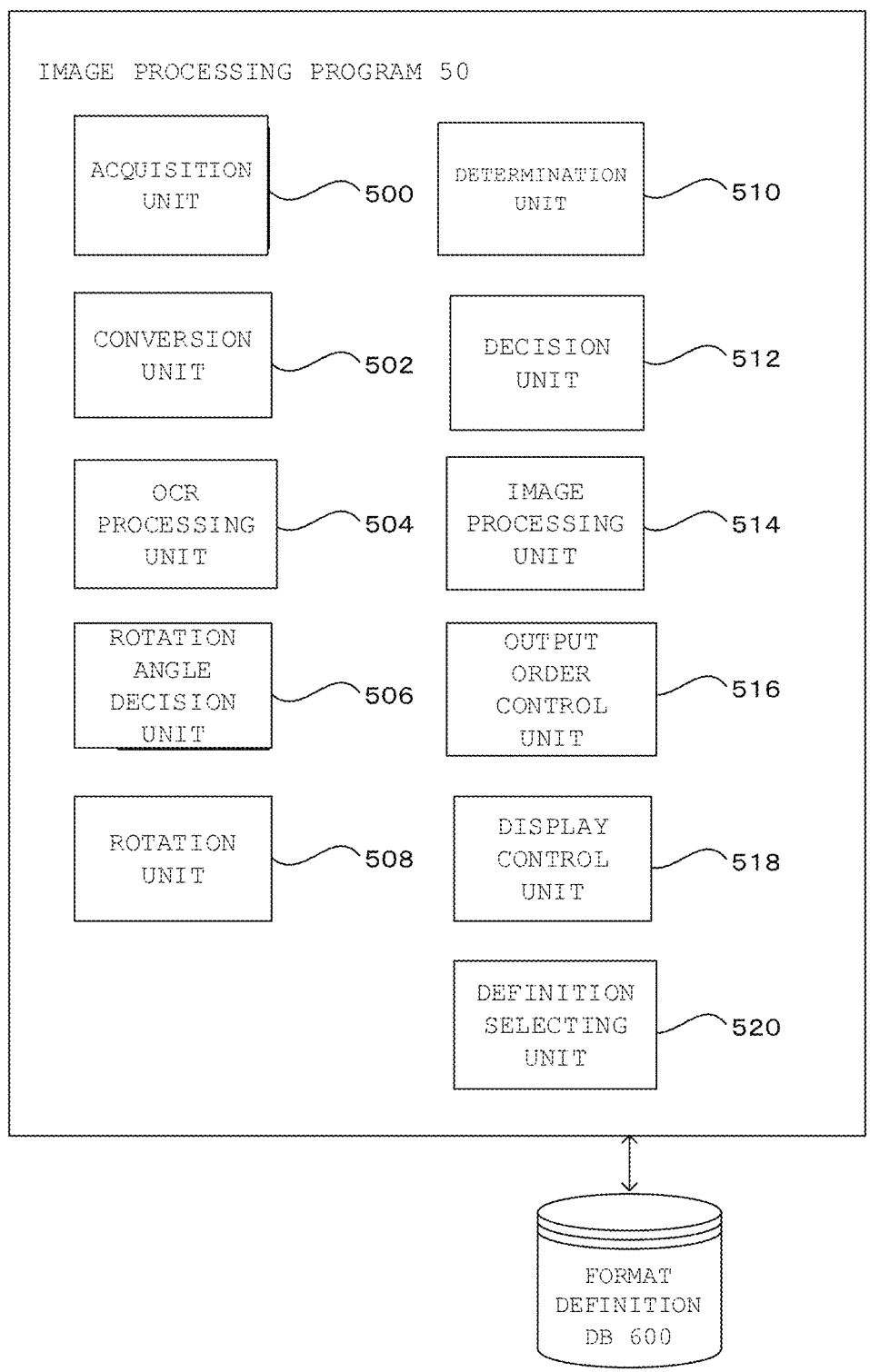
FIG. 4 is a drawing illustrating the functional configuration of the image processing device 5.

In one example, the HDD 204 is implemented as a hard disk drive device, and, as a non-volatile recording device, stores computer programs (for example, an image processing program 50 of FIG. 4) and other data files (for example, a format definition database 600 of FIG. 4).

The network IF 206 is an interface for carrying out wireless or wired communication and, in one example, realizes communication on an internal network 7.

In one example, the display device 208 is implemented as a liquid crystal display.

In one example, the input device 210 is implemented as a keyboard and a mouse.

FIG. 4 is a drawing illustrating the functional configuration of the image processing device 5.

As illustrated in FIG. 4, the image processing program 50 is installed and the format definition database 600 (format definition DB 600) is constructed in the image processing device 5 of the present embodiment.

The image processing program 50 includes an acquisition unit 500, a conversion unit 502, an OCR processing unit 504, a rotation angle decision unit 506, a rotation unit 508, a determination unit 510, a decision unit 512, an image processing unit 514, an output order control unit 516, a display control unit 518, and a definition selecting unit 520.

Note that a portion or the entirety of the image processing program 50 may be realized by hardware such as an ASIC, or may be realized by borrowing a portion of the functions of an operating system (OS).

In the image processing program 50, the acquisition unit 500 acquires the image data of both sides of the ID card read by the scanner 3.

The conversion unit 502 binarizes the image data. Specifically, the conversion unit 502 extracts a region presumed to be a character string on the basis of the clumping condition of black dots in the binary image.

The OCR processing unit 504 performs character recognition processing on the image data.

The rotation angle decision unit 506 decides a rotation angle of the image data that increases the accuracy of the character recognition. Specifically, in face detection by the determination unit 510 (described later), since an upright face image is required, the rotation angle decision unit 506 decides a rotation angle of the image data at which the face image is upright. The phrase "upright face image" refers to a face image with the head positioned at the top and the chin positioned at the bottom which the determination unit 510 (described later) can recognize as a face image.

The rotation unit 508 performs rotation processing of the image for each piece of inputted image data. Specifically, the rotation unit 508 rotates the image data by the rotation angle decided by the rotation angle decision unit 506.

The determination unit 510 determines the presence or absence of a face image for a plurality of pieces of image data read from at least one image presenting medium. Specifically, the determination unit 510 determines the presence or absence of a face image for two pieces of image data read from one ID card. More specifically, the determination unit 510 determines the presence or absence of a face image for the image data that has been subjected to the rotation processing by the rotation unit 508.

The decision unit 512 decides a relationship for the plurality of pieces of image data on the basis of the determination results of the determination unit 510. Herein, the term "relationship" means the front and back of the ID card or the page order. Specifically, in a case in which the determination unit 510 determines that only one of the two pieces of image data includes a face image, the decision unit 512 decides the relationship between those pieces of image data. More specifically, the decision unit 512 decides that the image data that includes a face image is on the front side of the ID card or on a page before the image data not including a face image.

Additionally, in a case in which the determination unit 510 determines that only one of the two pieces of image data includes a face image, the decision unit 512 decides the relationship between those pieces of image data.

The image processing unit 514 changes the image processing for the image data in accordance with the relationship between the image data decided by the decision unit 512. Specifically, the image processing unit 514 decides to perform, in accordance with the front and back of the image data or the page order, swapping of the front and bank of the image data, changing of the page numbers of the image data, or binarizing of the image data.

The output order control unit 516 swaps the output order of the image data in accordance with the relationship decided by the decision unit 512. Specifically, the output order control unit 516 swaps the front and back of the image data and swaps the output order of the images in accordance with the front and back of the ID card decided by the decision unit 512. Additionally, the output order control unit 516 changes the page numbers associated with the image data in accordance with the page order decided by the decision unit 512.

In a case in which the determination unit 510 determines that a face image is included in both of the two pieces of image data, or in a case in which the determination unit 510 determines that a face image is not included in either of the two pieces of image data, the display control unit 518 performs a display for prompting a user to perform an operation. Specifically, the display control unit 518 performs a display for prompting the user to confirm face image detection results, or a display for prompting the user to select whether the image data is on the front side or the back side.

The definition selecting unit 520 selects, on the basis of the relationship decided by the decision unit 512, definition information for performing character recognition processing. Specifically, the definition selecting unit 520 selects a format definition (OCR template) which the OCR processing unit 504 is to use from the format definition DB 600 on the basis of the front and back of the image data or the page order decided by the decision unit 512.

Figure 5:
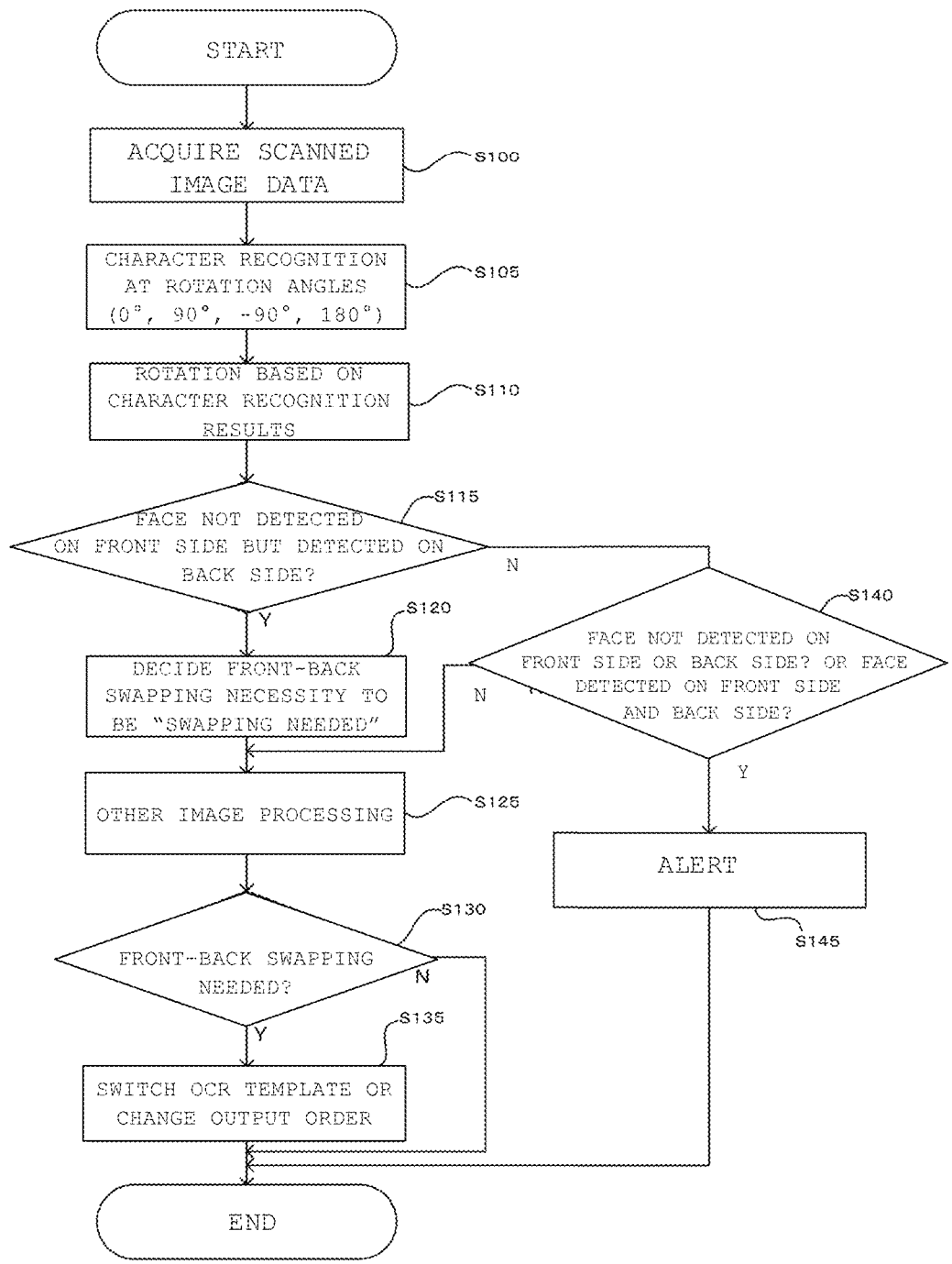
FIG. 5 is a flowchart explaining front and back determination processing (S10) carried out by the image processing device 5.

FIG. 5 is a flowchart explaining front and back determination processing (S10) carried out by the image processing device 5.

The image processing device 5 includes a multi-core CPU and operates on multiple threads. Note that, in the processing state, the term "Wait" means wait for processing, "Proc" means in processing, and "Done" means that processing is completed.

As illustrated in FIG. 5, in step 100 (S100), the acquisition unit 500 acquires the image data of the front side and the back side of the ID card acquired by the scanner 3. Specifically, the acquisition unit 500 acquires, from the scanner 3, the image data of the front side and the back side and the page numbers associated with the image data. In one example, the image data and the page numbers are associated as follows. The first page front is associated with page number "1", and the second page back is associated with page number "2." The acquisition unit 500 adds each piece of image data to an image processing wait (Wait state) queue. When the image processing thread starts the image processing, the state is updated from "Wait" to "Proc."

In step 105 (S105), the conversion unit 502 binarizes the acquired image data, and extracts a region presumed to be a character string on the basis of the clumping condition of black dots in the binary image. The OCR processing unit 504 performs character recognition while rotating the extracted region presumed to be a character string by 0 degrees, 90 degrees, −90 degrees, and 180 degrees. The rotation angle decision unit 506 decides, from the character recognition results at each rotation angle, the rotation angle where the accuracy of the character recognition is highest.

In step 110 (S110), the rotation unit 508 rotates the image data by the angle decided by the rotation angle decision unit 506. In a case in which a face image is included in the image data as a result of the rotating, the face image is in an upright state.

In step 115 (S115), the determination unit 510 determines, for each of the image data of page number "1" and the image data of page number "2", whether a face image is included in the image data. Specifically, the determination unit 510 detects a face in the image data using Haar Cascades included in OpenCV, which is open source software. Provided that a face can be detected, the determination unit 510 may detect a face using eigenfaces, for example, instead of Haar Cascades.

The front and back determination processing (S10) transitions to S120 when the determination unit 510 does not detect a face image in the image data of the page number "1" and does detect a face image in the image data of the page number "2", and otherwise transitions to S140. Here, the determination unit 510 waits until the face detection processing of the image data of both the page number "1" and the page number "2" is complete.

In step 120 (S120), the decision unit 512 decides, as shown in FIG. 6, front and back swapping necessity that informs of swapping the front and back, to be "swapping needed", and stores the result. The decision unit 512 makes this decision on the basis of the presence or absence of a face image in the image data of the page number "1" and the page number "2". The processing that requires waiting is completed, and thus, the determination unit 510 cancels the waiting. The image processing unit 514 decides the image processing for the image data in accordance with the relationship decided by the decision unit 512.

In step 125 (S125), the conversion unit 502 performs the remaining image processing, for example, binarization on each piece of the image data. When all of the image processing is complete, the image processing thread changes the state of each piece of the image data in the image processing wait queue from "Proc" to "Done." Furthermore, the image processing thread deletes the page for which the page number is smallest and the state is "Done" from the image processing wait queue, and registers the deleted page in a processed image queue.

In step 130 (S130), if the image processing unit 514 determines that swapping of the front and back is necessary, the output order control unit 516 transitions to S135 and, when not necessary, the front and back determination processing (S10) ends.

In step 135 (S135), the definition selecting unit 520 switches, on the basis of the front and back swapping necessity decided by the decision unit 512, the OCR template that is the format definition to be used in the OCR processing, and the OCR processing unit 504 uses the OCR template selected by the definition selecting unit 520 to perform OCR processing on each piece of the image data.

In S135, the OCR template is switched on the basis of the front and back swapping necessity. However, the output order control unit 516 may, on the basis of the front and back swapping necessity decided by the decision unit 512, swap the front and back of the image data of the page number "1" acquired as the front side and the image data of the page number "2" acquired as the back side, and swap the output order of the images.

In step 140 (S140), in a case in which the determination unit 510 detects a face image in both the image data of the page number "1" and the image data of the page number "2", or in a case in which the determination unit 510 does not detect a face image in either the image data of the page number "1" or the image data of the page number "2", the front and back determination processing (S10) determines the front and back swapping necessity to be "swapping candidate" and transitions to S145, and otherwise determines the front and back swapping necessity to be "do not swap" and transitions to S125.

In step 145 (S145), the display control unit 518 performs a display for prompting the user to perform an operation. Specifically, the display control unit 518 performs a display for prompting the user to confirm face image detection results, or a display for prompting the user to select whether the image data is on the front side or the back side.

The image processing device 5 includes a multi-core CPU and, as such, performs the image processing in parallel on the image data acquired as the front side and the image data acquired as the back side. In a case in which the image data acquired as the front side and the image data acquired as the back side are required, the image processing device 5 causes the processing to wait, thereby making it possible to shorten the overall processing time of the image processing.

Next, the OCR templates which the OCR processing unit 504 uses in the character recognition are described.

FIG. 7 is a table showing OCR templates based on the front and back swapping necessity.

When performing character recognition of the image data after the front and back swapping necessity is decided, the OCR processing unit 504 performs character recognition using an OCR template corresponding to the result of the front and back swapping necessity.

Specifically, as shown in FIG. 7, for image data for which the result of the front and back swapping necessity is "swapping needed", the definition selecting unit 520 selects the OCR template for the side opposite the paper feed side. For example, in a case in which the image data acquired as the front side is image data of the back side, the OCR processing unit 504 uses the OCR template for the back side selected by the definition selecting unit 520.

For image data for which the result of the front and back swapping necessity is "swapping candidate", the definition selecting unit 520 selects both the OCR template for the paper feed side and the OCR template for the side opposite the paper feed side. For example, in a case in which it is not possible to determine whether the image data acquired as the front side is image data of the front side or image data of the back side, the OCR processing unit 504 uses both the OCR template for the paper feed side and the OCR template for the side opposite the paper feed side selected by the definition selecting unit 520.

For image data for which the result of the front and back swapping necessity is "do not swap", the definition selecting unit 520 selects the OCR template for the paper feed side. For example, in a case in which the image data acquired as the front side is image data of the front side, the OCR processing unit 504 uses the OCR template for the paper feed side selected by the definition selecting unit 520.

As described above, according to the image processing device 5, even in a case in which the front and back of the ID card are read in reverse by the scanner 3, it is possible to determine, on the basis of the presence or absence of a face image, whether the image data read as the front side and the image data read as the back side are on the front side or the back side, and change the processing content, to be performed on the image data, in accordance with the determined results. That is, according to the image processing device 5, it is possible to appropriately recognize characters on the front side and the back side of an ID card, regardless of whether the placement of the ID card by the scanner operator is correct or incorrect.

In the embodiment described above, the rotation angle is determined on the basis of the accuracy of character recognition in the region presumed to be a character string. However, the present invention is not limited thereto, and a configuration is possible in which the rotation angle is determined on the basis of whether the determination unit 510 can detect a face image at each rotation angle, while rotating the image data by 0 degrees, 90 degrees, −90 degrees, and 180 degrees.

In the embodiment described above, the image processing device 5 determines the front and back of the image data read by the scanner 3. However, the present invention is not limited thereto, and a configuration is possible in which the scanner 3 reads the image data and includes a determination unit 510 configured to determine presence or absence of a face image for the read image data and a decision unit 512 configured to decide a relationship between the plurality of pieces of image data on the basis of the determination results of the determination unit 510.

REFERENCE SIGNS LIST

1 Image processing system
3 Scanner
5 Image processing device
50 Image processing program
500 Acquisition unit
502 Conversion unit
504 OCR processing unit
506 Rotation angle decision unit
508 Rotation unit
510 Determination unit
512 Decision unit
514 Image processing unit
516 Output order control unit
518 Display control unit
520 Definition selecting unit
600 Format definition database

The invention claimed is:

1. An image processing device comprising a processor configured to:
 determine presence or absence of a face image for two pieces of image data read from one image presenting medium;
 decide a relationship of the two pieces of image data, in a case when the processor determines only one of the two pieces of image data includes a face image; and
 swap an output order of the image data, in accordance with the decided relationship.

2. An image processing device comprising a processor configured to:
 determine presence or absence of a face image for two pieces of image data read from one image presenting medium; and
 perform a display for prompting a user to perform an operation, in a case when the processor determines that a face image is included in both of the two pieces of image data, or in a case when the processor determines that a face image is not included in either of the two pieces of image data.

3. An image processing method comprising:
 determining presence or absence of a face image for two pieces of image data read from one image presenting medium;
 deciding a relationship of the two pieces of image data in response to determining that only one of the two pieces of image data includes a face image; and
 swapping an output order of the image data, in accordance with the decided relationship.

4. A non-transitory computer-readable recording medium storing thereon a computer program that causes a computer to perform a method comprising:
 determining presence or absence of a face image for two pieces of image data read from one image presenting medium;
 deciding a relationship of the two pieces of image data in response to determining that only one of the two pieces of image data includes a face image; and
 swapping an output order of the image data, in accordance with the decided relationship.

5. An image processing method comprising:
 determining presence or absence of a face image for two pieces of image data read from one image presenting medium; and
 performing a display for prompting a user to perform an operation in response to determining that a face image is included in both of the two pieces of image data, or in response to determining that a face image is not included in either of the two pieces of image data.

6. A non-transitory computer-readable recording medium storing thereon a computer program that causes a computer to perform a method comprising:
 determining presence or absence of a face image for two pieces of image data read from one image presenting medium; and
 performing a display for prompting a user to perform an operation in response to determining that a face image is included in both of the two pieces of image data, or in response to determining that a face image is not included in either of the two pieces of image data.

* * * * *